United States Patent Office 3,472,893
Patented Oct. 14, 1969

3,472,893
HERBICIDAL TROPOLONE ESTERS
Lorraine Guy Donaruma, Potsdam, N.Y., assignor to Research Corporation, New York, N.Y., a non-profit corporation of New York
No Drawing. Original application Aug. 2, 1965, Ser. No. 476,732, now Patent No. 3,399,989, dated Sept. 3, 1968. Divided and this application Oct. 10, 1967, Ser. No. 698,997
Int. Cl. C07c 79/46; A01n 9/20
U.S. Cl. 260—471           2 Claims

ABSTRACT OF THE DISCLOSURE

Novel tropolone nitrobenzoate esters of the formula

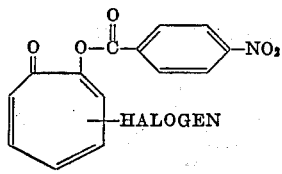

effective as broadleaf herbicides.

---

This application is a divisional application of my application Ser. No. 476,732, filed Aug. 2, 1965, now U.S. Patent 3,399,989.

This invention relates to tropolone compositions. In one specific aspect, it relates to nitrobenzoate esters of tropolone and to methods for using such esters as herbicides.

The seven-numbered ring compound 2,4,6-cycloheptatrien-2-ol-1-one, better known as tropolone, is representative of a class of compounds known as tropolones. These compounds exhibit quasi-aromatic activity and undergo nuclear substitution. Thus, the tropolone nucleus can be chlorinated, brominated, iodonated or fluorinated, directly or indirectly, in a manner somewhat analogous to compounds of the benzene series.

While the carbonyl group of tropolone compounds resists normal ketone reactions, the hydroxyl group undergoes acylation and can be esterified, for example, with nitrobenzoyl halides.

It is an object of the present invention to provide a class of tropolone nitrobenzoate esters which exhibits pronounced herbicidal activity.

It is a further object of the invention to provide a method for controlling vegetation using such tropolone nitrobenzoate esters.

In its process aspect, the present invention is a method for controlling the growth of vegetation which comprises applying to the vegetation being controlled a phytotoxic amount of a composition of the formula:

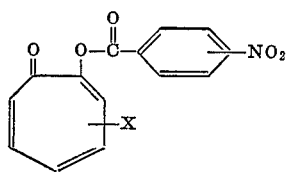

wherein X is hydrogen or a halogen, i.e., fluorine, chlorine, bromine or iodine.

In its composition aspect, the present invention is a class of compounds of the formula:

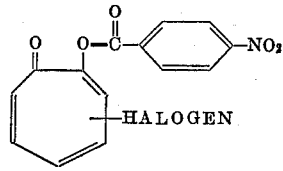

The nitrobenzoate esters for use in the process of the present invention are most conveniently prepared by the reaction of a nitrobenzoyl halide, such as p-nitrobenzoyl chloride, with the corresponding tropolone compound as its sodium or potassium salt. Preferably, the acylation is effected under anhydrous conditions and in the presence of a solvent. Pyridine is particularly suitable for use as the solvent, alone or in conjunction with an aromatic hydro-carbon solvent.

The above-described nitrobenzoate esters exhibit herbicidal activity. In practice, herbicidal compounds are often formulated as emulsions, solutions or with a solid carrier. The present tropolone nitrobenzoate esters are most commonly employed dissolved in a solvent, preferably an oxygen-containing solvent such as a lower ester or lower ketone, and applied directly to the vegetation whose growth is to be controlled. The exact concentration of the tropolone nitrobenzoate ester in the solvent is not critical, and the solvent may contain other adjuvants or diluents. In order to obtain the beneficial herbicidal effect of these esters, the composition or formulation applied should be adjusted to contain and distribute the ester at the rate of at least 1.0 pound per acre being treated. The optimum dosage, under any given set of conditions, may readily be determined by simple test procedures.

My invention is further illustrated by the following nonlimiting examples showing the making and using of herbicides of tropolone nitrobenzoate esters.

EXAMPLE 1

Ten grams (0.083 mole) of tropolone was dissolved in 150 milliliters of 95% ethanol. An equimolar amount of sodium methylate was added. Eleven grams of the sodium salt of tropolone formed as a bright yellow precipitate.

EXAMPLE 2

In a three necked flask equipped with a stirrer and a condenser, was placed 3.0 grams (0.02 mole) of the sodium salt of tropolone, 3.2 grams of dry pyridine, and 100 milliliters of dry benzene. With vigorous stirring, 3.7 grams (0.02 mole) of p-nitrobenzoyl chloride was added in small portions. The mixture was stirred for one hour with the formation of a white solid which was filtered and dried. Recrystallization from ethanol gave 4.8 grams or an 88% yield of the p-nitrobenzoate ester of tropolone as long white needles melting at 175–176° C.

Analysis ($C_{14}H_9O_5N$).—Calculated: C, 62.00; H, 3.34. Found: C, 62.00; H, 3.60.

EXAMPLE 3

The sodium salt of tropolone (5.0 grams; 0.034 mole) and 4.7 grams (0.034 mole) of potassium carbonate were dissolved in 200 milliliters of refluxing methanol. An equimolar amount of iodine (8.6 grams) was added in small portions. The iodine color disappeared upon addition of each portion. After complete addition, refluxing was continued for one hour. The reaction mixture was cooled and the methanol was removed by evaporation leaving 7.8 grams (80%) of the potassium salt of 3-iodotropolone. Addition of a portion of the potassium salt to dilute acetic acid liberated free 3-iodotropolone, M.P. 102–04° C.

EXAMPLE 4

In a three necked flask equipped with a mechanical stirrer and a condenser, was placed 10 grams (0.036 mole) of the potassium salt of 3-iodotropolone, 5.7 grams of dry pyridine, and 200 milliliters of dry benzene. The reaction was stirred with the addition of 6.7 grams (0.036 mole) of p-nitrobenzoyl chloride in small portions. The reaction was heated to 60° C. with a water bath and maintained at that temperature for one hour with stirring. The precipitate was filtered off, washed with water, 5% sodium hydroxide, and finally with water. The crude product weighing 2.85 grams was recrystallized from ethanol to give the n-nitrobenzene ester of 3-iodotropolone as pale yellow needles with a M.P. of 181–83° C.

Analysis ($C_{14}H_8O_5NI$).—Calculated: C, 42.30; H, 2.03. Found: C, 41.88; H, 2.33.

The herbicidal test method employed was as follows:

The test compound was dissolved in acetone containing 0.5% of a detergent (Tween 20) and vertically sprayed onto potted seedlings. The application rates were equivalent to 0.1 to 1.0 pound per acre applications of the test compound.

Test compound, at each rate, was applied to six species of week old seedlings in duplicate. The treated plants were observed in 1–2, 5 and 10–14 days after treatment and scored as indicated:

1 = no visible effect.
2 = slight visible effect.
3 = moderate visible effect.
4 = severe visible effect.

The following test results were obtained using the p-nitrobenzoate ester of tropolone, a representative nitrobenzoate ester of tropolone, as the test compound:

| Crops | | Rate, lb/ acre | Chlorosis | Contact | Formative | Killing | Necrosis | Activity rating |
|---|---|---|---|---|---|---|---|---|
| Species | Variety | | | | | | | |
| Bean | Black Valentine | 0.1 | | | 2 | | | 2 |
| | | 1.0 | | 4 | | | 3 | 3 |
| Soybean | Lincoln | 0.1 | | | 2 | | 2 | 2 |
| | | 1.0 | | 4 | | | 4 | 4 |
| Morning glory | Heavenly Blue | 0.1 | | | | | | 1 |
| | | 1.0 | | 4 | | 2 | 3 | 3 |
| Radish | Scarlet Globe | 0.1 | 2 | | 2 | | | 2 |
| | | 1.0 | | 4 | | 2 | 4 | 4 |
| Oat | Clinton | 0.1 | | | | | 2 | 2 |
| | | 1.0 | | 4 | | | 3 | 3 |
| Rice | P.I. 8970 | 0.1 | | | | | | 1 |
| | | 1.0 | | 3 | | | 2 | 2 |

The p-nitrobenzoate ester of tropolone is representative of other tropolone nitrobenzoates. The other nitrobenzoates described above may also be employed as herbicides in the indicated manner.

I claim:
1. Compounds of the formula:

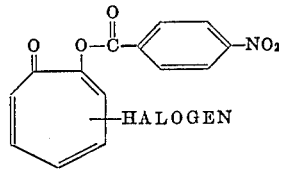

2. 3-iodotropolone p-nitrobenzoate.

References Cited

Chemical Abstract, by Cornell et al., vol. 63 (1965), pp. 2924F to 2925A relied on.

LORRAINE A. WEINBERGER, Primary Examiner

L. ARNOLD THAXTON, Assistant Examiner

U.S. Cl. X.R.

71—111